US008265861B2

(12) United States Patent
Ikeda et al.

(10) Patent No.: US 8,265,861 B2
(45) Date of Patent: Sep. 11, 2012

(54) DRIVING ASSIST SYSTEM AND VEHICLE-MOUNTED APPARATUS

(75) Inventors: Takuro Ikeda, Kawasaki (JP); Toshiyuki Fukuoka, Kawasaki (JP); Eiji Kitagawa, Kawasaki (JP); Kyouko Okuyama, Kawasaki (JP); Ryosuke Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 981 days.

(21) Appl. No.: 12/073,036

(22) Filed: Feb. 28, 2008

(65) Prior Publication Data

US 2008/0215232 A1 Sep. 4, 2008

(30) Foreign Application Priority Data

Mar. 2, 2007 (JP) ................................ 2007-052656

(51) Int. Cl.
*G06F 19/00* (2011.01)

(52) U.S. Cl. ......................... 701/117; 701/422; 701/423

(58) Field of Classification Search .............. 701/23-26, 701/117, 422-423
See application file for complete search history.

(56) References Cited

U.S. PATENT DOCUMENTS

| | | | | |
|---|---|---|---|---|
| 5,982,298 | A | 11/1999 | Lappenbusch et al. | |
| 6,442,473 | B1 | 8/2002 | Berstis et al. | |
| 6,643,581 | B2 * | 11/2003 | Ooishi | 701/207 |
| 7,010,397 | B1 | 3/2006 | Pfleging et al. | |
| 7,343,242 | B2 * | 3/2008 | Breitenberger et al. | 701/117 |
| 7,433,676 | B2 * | 10/2008 | Kobayashi et al. | 455/408 |
| 7,440,842 | B1 * | 10/2008 | Vorona | 701/117 |
| 7,603,138 | B2 * | 10/2009 | Zhang et al. | 455/556.1 |
| 7,613,564 | B2 * | 11/2009 | Vorona | 701/117 |
| 7,908,076 | B2 * | 3/2011 | Downs et al. | 701/117 |
| 7,912,627 | B2 * | 3/2011 | Downs et al. | 701/117 |
| 2003/0204306 | A1 | 10/2003 | Yamamoto et al. | |

FOREIGN PATENT DOCUMENTS

| | | | |
|---|---|---|---|
| CN | 1453751 | A | 11/2003 |
| DE | 199 38 266 | A1 | 2/2001 |
| DE | 10 2007 011 122 | A1 | 9/2007 |
| EP | 1 357 529 | A2 | 10/2003 |
| EP | 1 503 354 | A1 | 2/2005 |
| GB | 1 229 321 | | 4/1971 |
| JP | 8-293098 | | 11/1996 |
| JP | 2002-46504 | | 2/2002 |
| JP | 2004-21514 | | 1/2004 |
| JP | 2005-141543 | | 6/2005 |
| JP | 2005-156169 | | 6/2005 |
| WO | 01/43104 | A1 | 6/2001 |

OTHER PUBLICATIONS

Japanese Office Action issued Apr. 26, 2011 in corresponding Japanese Patent Application 2007-052656.

Extended European Search Report, issued Jul. 2, 2008, in the European Patent Application No. 08101960.6.

Chinese Office Action mailed Sep. 25, 2009 and issued in corresponding Chinese Patent Application 2008100823573.

* cited by examiner

*Primary Examiner* — Hussein A. Elchanti
(74) *Attorney, Agent, or Firm* — Staas & Halsey LLP

(57) ABSTRACT

There is provided a driving assist system comprising: a road side apparatus which transmits the traffic circumstance information; and a vehicle-mounted apparatus including: an outputting part which outputs driving assist information for assisting a driving operation on the basis of output data on the basis of the at least one kind of the traffic circumstance information; and a controller for: generating the output data for outputting the driving assist information based on the traffic circumstance information; determining whether the output data is valid; and selecting one the output data which is determined as valid, on the basis of a predetermined standard validity, wherein the outputting part outputs the driving assist information using the selected output data.

16 Claims, 12 Drawing Sheets

F I G. 4

| | PREMISE CONDITION CONCERNING CIRCUMSTANCE | ALLOWABLE CONDITIONS TO BE SATISFIED FOR EACH OUTPUT METHOD | | |
|---|---|---|---|---|
| | DISTANCE TO A CROSSING | TIME DELAY | UPDATE FREQUENCY OF VIDEO INFORMATION (FRAME RATE) | UPDATE FREQUENCY OF POSITON INFORMATION OF OTHER VEHICLES |
| VIDEO DISPLAY | LESS THAN 30 m | 0.2 sec OR LESS | 30 fps OR GREATER | |
| | 30 m OR GREATER | 0.4 sec OR LESS | 15 fps OR GREATER | |
| VEHICLE POSITION DISPLAY | LESS THAN 30 m | 0.3 sec OR LESS | | 10 Hz OR GREATER |
| | 30 m OR GREATER | 0.6 sec OR LESS | | 5 Hz OR GREATER |
| VEHICLE PRESENCE DISPLAY | LESS THAN 30 m | 1.0 sec OR LESS | | 2 Hz OR GREATER |
| | 30 m OR GREATER | 2.0 sec OR LESS | | 1 Hz OR GREATER |

F I G. 10

| | ALLOWABLE CONDITIONS TO BE SATISFIED FOR EACH OUTPUT METHOD | | | |
|---|---|---|---|---|
| | TIME DELAY | UPDATE FREQUENCY OF VIDEO INFORMATION (FRAME RATE) | UPDATE FREQUENCY OF POSITION INFORMATION OF OTHER VEHICLES | ERROR RANGE |
| VIDEO DISPLAY | 0.2 sec OR LESS | 30 fps OR GREATER | | |
| VEHICLE POSITION DISPLAY | 0.3 sec OR LESS | | 10 Hz OR GREATER | 3 m OR LESS |
| VEHICLE PRESENCE DISPLAY | 1.0 sec OR LESS | | 2 Hz OR GREATER | 10 m OR LESS |

F I G. 12

| | ALLOWABLE CONDITIONS TO BE SATISFIED FOR EACH OUTPUT METHOD | | | | |
|---|---|---|---|---|---|
| | TIME DELAY | UPDATE FREQUENCY OF VIDEO INFORMATION (FRAME RATE) | UPDATE FREQUENCY OF POSITION INFORMATION OF OTHER VEHICLES | POSITION ACCURACY | VIDEO EFFICIENCY |
| VIDEO DISPLAY | 0.2 sec OR LESS | 30 fps OR GREATER | | | YES |
| VEHICLE POSITION DISPLAY | 0.3 sec OR LESS | | 10 Hz OR GREATER | HIGH | |
| VEHICLE PRESENCE DISPLAY | 1.0 sec OR LESS | | 2 Hz OR GREATER | MODERATE | |

DRIVING ASSIST SYSTEM AND VEHICLE-MOUNTED APPARATUS

CROSS-REFERENCE TO RELATED APPLICATION

This nonprovisional application claims priority under 35 U.S.C. §119(a) on Patent Application No. 2007-052656 in Japan on Mar. 2, 2007, the entire contents of which are hereby incorporated by reference.

BACKGROUND

1. Technical Field

The present invention relates to: a driving assist system comprising a vehicle-mounted apparatus mounted on a vehicle and a road side apparatus installed on a road side, wherein the road side apparatus obtains traffic circumstance and then transmits traffic circumstance information representative of the obtained traffic circumstance, to the vehicle-mounted apparatus, wherein the vehicle-mounted apparatus outputs driving assist information for assisting driving on the basis of the received traffic circumstance information; and a vehicle-mounted apparatus employed in this driving assist system.

2. Description of Related Art

A driving assist system has been proposed that employs road-side-to-vehicle communication in which a road side apparatus is installed on the road side where a vehicle runs and in which the road side apparatus communicates with a vehicle-mounted apparatus mounted on the vehicle (see, for example, Japanese Patent Application Laid-Open No. 2002-046504). In Advanced Cruise Highway System (AHS) which is a typical one of driving assist systems employing road-side-to-vehicle communication, a road side apparatus is installed that has a sensor and a camera for detecting the position of a vehicle. Then, vehicle position information detected by the sensor and video information obtained by the camera are transmitted from the road side apparatus to a vehicle-mounted apparatus. The vehicle-mounted apparatus outputs: the video based on the received video information; the image based on the vehicle position information; informing sound; and voice, so as to performs driving assist services such as collision avoidance assist at the time of right turn and collision avoidance assist at the time of meeting suddenly. For example, as collision avoidance assist at the time of right turn, the road side apparatus transmits to the vehicle-mounted apparatus a video of a dead area relative to the driver, which is formed by the presence of an oncoming right-turn vehicle. Alternatively, information representative of the positions of other approaching vehicles is transmitted.

SUMMARY

Nevertheless, a problem arises that appropriate information is not presented to the driver owing to an unsatisfactory communication situation. As a particular example, communication delay could cause a situation that the video obtained by the camera and the positions of other vehicles detected by the sensor are displayed in a state different from the real ones. Further, when radio waves are cut off or reflected by other vehicles around the own vehicle, information loss such as code error could occur so as to cause an abnormal situation such as video display disturbance, drop frame, and temporary stop. Furthermore, depending on the circumstance such as the weather and the surrounding brightness, video clearness and detection accuracy could degrade. When the information is presented in these states, efficient information cannot not be presented to the driver and, in addition, erroneous determination could be made by the driver so that a possibility of safety degradation could arise. In the prior art, control may be performed such that when communication failure or sensor failure occurs, information presentation to the driver is stopped. Nevertheless, in this case, the driver need recognize the traffic circumstance by oneself.

An object is to provide: a driving assist system in which traffic circumstance information representative of the traffic circumstance is transmitted from a road side apparatus to a vehicle-mounted apparatus and in which the vehicle-mounted apparatus determines at all times the validity of the driving assist information outputted on the basis of the received traffic circumstance information so as to select appropriate output processing and then execute the processing, so that in a state that information presentation which could cause erroneous determination to the driver is suppressed, information presentation to the driver can be continued as long as effective driving assist information is present; and a vehicle-mounted apparatus employed in this driving assist system.

There is provided a driving assist system according to an aspect, the system comprising: a road side apparatus which is located in a road side, obtains a traffic circumstance and transmits traffic circumstance information representative of the obtained traffic circumstance; and a vehicle-mounted apparatus, which is mounted in a vehicle, including: a communication part which receives the transmitted at least one kind of the traffic circumstance information; an outputting part which outputs at least one kind of driving assist information for assisting a driving operation on the basis of the traffic circumstance information; and a controller capable of performing the operations of: generating at least one kind of output data which the outputting part uses for outputting the at least one kind of driving assist information; deriving at least one kind of information according to validity of an output concerning the respective generated at least one kind of the output data, every time receiving the traffic circumstance information; determining whether or not each of the at least one kind of the outputting data is valid, on the basis of the at least one kind of the derived information according to the validity of the output concerning the respective the output data; and selecting one kind of the output data which is determined as valid, on the basis of a predetermined standard validity, wherein the outputting part outputs the driving assist information using the selected one of the output data.

There is provided a vehicle-mounted apparatus according to an aspect, the apparatus mounted in a vehicle, the apparatus comprising: a communication part which receives, from an outside, at least one kind of traffic circumstance information representative of a traffic circumstance; an outputting part which outputs at least one kind of driving assist information for assisting a driving operation on the basis of the received at least one kind of the traffic circumstance information; and a controller capable of performing the operations of: generating at least one kind of output data which the outputting part uses for outputting the at least one kind of driving assist information; deriving at least one kind of information according to the validity of an output concerning the respective generated at least one kind of the output data, every time receiving the traffic circumstance information; determining whether or not each of the at least one kind of the output data is valid, on the basis of the at least one kind of the derived information according to the validity of the output concerning the respective at least one kind of the output data; and selecting one of the at least one kind of the output data which is determined as valid, on the basis of a predetermined standard, wherein the outputting part outputs the driving assist information using the selected one of the at least one kind of the output data.

In the above-mentioned aspects, processing performing means is selected appropriately on the basis of information concerning the validity of each processing performing means, so that driving assist information is outputted by an appropriate output method. For example, when during the execution of particular processing performing means, the information concerning the validity of each processing performing means varies and hence the validity of the present processing performing means exceeds an allowable range, information presentation is performed in a state that the processing performing means is switched if another processing performing means has validity that falls within the allowable range. This reduces the possibility that the driver makes erroneous determination. Further, effective information is presented to the driver so that the safety is improved.

BRIEF DESCRIPTION OF THE SEVERAL VIEWS OF THE DRAWINGS

FIG. 4 is an explanation diagram conceptually showing an example of recording contents of a validity determination table provided in a vehicle-mounted apparatus according to Embodiment 1.

FIG. 10 is an explanation diagram conceptually showing an example of recording contents of a validity determination table provided in a vehicle-mounted apparatus according to Embodiment 2.

FIG. 12 is an explanation diagram conceptually showing an example of recording contents of a validity determination table provided in a vehicle-mounted apparatus according to Embodiment 3.

DETAILED DESCRIPTION

Embodiments are described below in detail with reference to the drawings.

<Embodiment 1>

Figure 1:
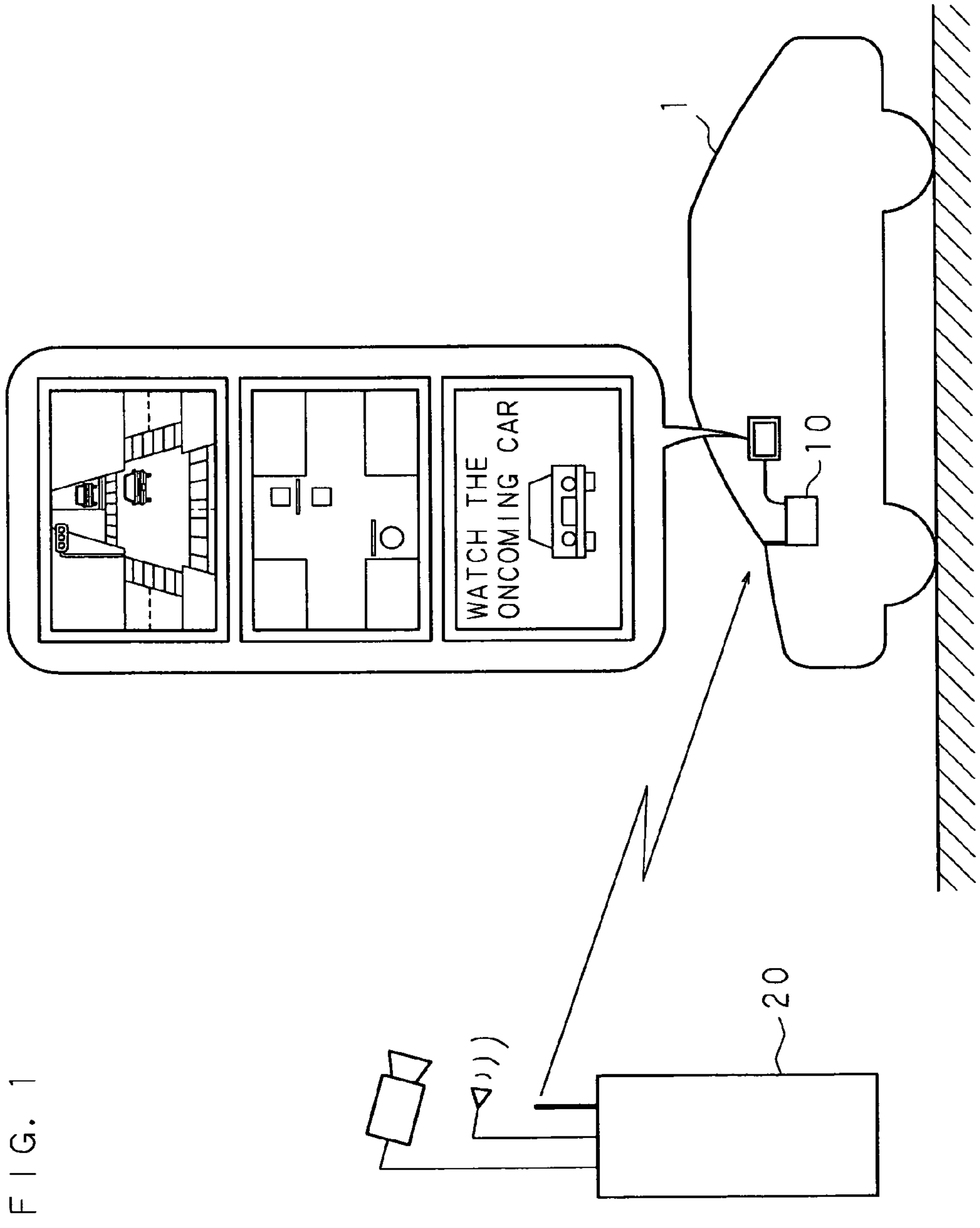
FIG. 1 is an explanation diagram conceptually showing an example of a driving assist system according to Embodiment 1.

FIG. 1 is an explanation diagram conceptually showing an example of a driving assist system according to Embodiment 1. In FIG. 1, numeral 1 indicates a vehicle. On the vehicle 1, a vehicle-mounted apparatus 10 such as an apparatus for car-navigation system is mounted. The vehicle-mounted apparatus 10 communicates with a road side apparatus 20 installed on the road side where the vehicle 1 runs.

The road side apparatus 20 is installed in the vicinity of a road where the vehicle 1 runs, especially in the vicinity of a crossing. The road side apparatus 20 detects also various circumstances such as the positions of vehicles approaching the crossing, the weather, and the brightness. The road side apparatus 20 further obtains circumstances based on a video obtained by the camera. The road side apparatus 20 further transmits traffic circumstances information representative of such circumstances. The vehicle-mounted apparatus 10 performs various output processing on the basis of the received traffic circumstances information so as to assist the running performed by the driver of the vehicle 1. The following description is given for an example of running assist in a case that the vehicle 1 enters a crossing and turns to the right. When the vehicle 1 is to turn to the right, it is important to recognize the circumstance of other vehicles entering the crossing, especially oncoming vehicles going straight. Here, the vehicle-mounted apparatus 10 can determine that the own vehicle 1 is to turn to the right, by detecting the states such as the lane where the own vehicle 1 is running and the operating situation of a blinker of the own vehicle 1.

Figure 2:
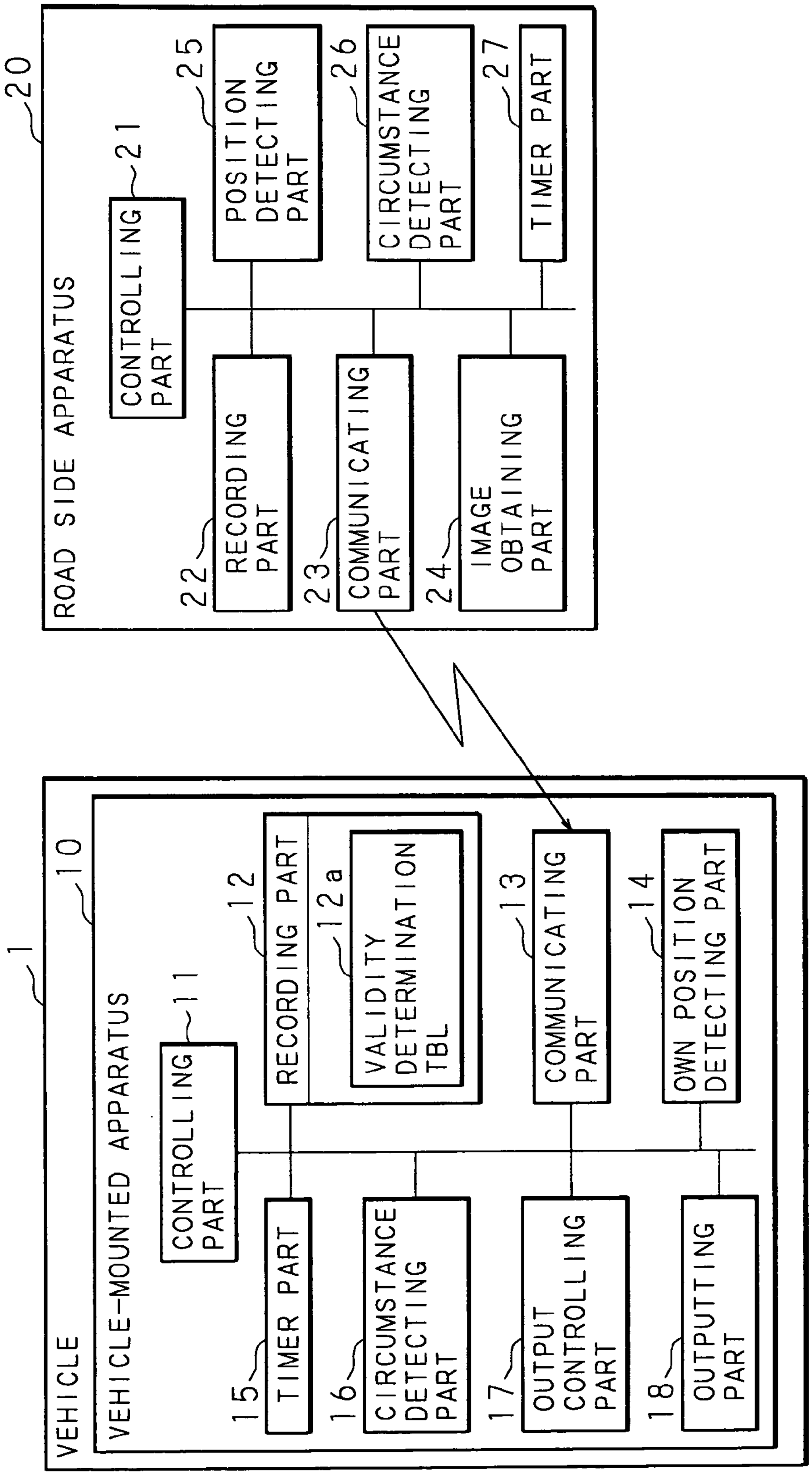
FIG. 2 is a block diagram showing an example of a hardware configuration of various apparatuses provided in a driving assist system according to Embodiment 1.

FIG. 2 is a block diagram showing an example of a hardware configuration of various apparatuses provided in the driving assist system according to Embodiment 1. The vehicle-mounted apparatus 10 has a controlling part 11 such as a CPU for controlling the entire apparatus. The vehicle-mounted apparatus 10 further has a recording part 12 such as a ROM, a hard disk, and a RAM for recording various kinds of information such as computer programs and data. The vehicle-mounted apparatus 10 further has: a communicating part 13 for communicating with the road side apparatus 20; an own position detecting part 14 such as a GPS (Global Positioning System) for detecting the position of the vehicle 1; and a timer part 15 serving as a clock and a timer. The vehicle-mounted apparatus 10 further has a circumstance detecting part 16 for detecting the circumstances of the vehicle 1 such as the speed of the vehicle 1, the lighting situation of the headlamps, and the operating situation of the wipers. The vehicle-mounted apparatus 10 further has: an output controlling part 17 for controlling output; and an outputting part 18 such as a monitor for outputting a video and a speaker for outputting voice on the basis of the control of the output controlling part 17.

The recording part 12 records a computer program for causing a computer to serve as the vehicle-mounted apparatus 10 of the present embodiment. The recording part 12 further records a computer program for causing a computer to serve as an apparatus for car-navigation system. The recording part 12 further records such various computer programs. Furthermore, the recording part 12 records a validity determination table (a validity determination TBL) 12*a* used for determination of the validity of output methods. This validity determination table is used for establishing correspondence between output methods and allowable conditions to be satisfied for the output methods becoming valid.

The road side apparatus 20 has a controlling part 21, a recording part 22, and a communicating part 23 for communicating with the vehicle-mounted apparatus 10. The road side apparatus 20 further has an image obtaining parts 24 such as a camera for obtaining an image of the circumstances of the road in the vicinity of a crossing or the like. The road side apparatus 20 further has a position detecting part 25 such as a vehicle detecting sensor for detecting the positions of vehicles approaching a crossing. The road side apparatus 20 further has a circumstance detecting part 26 for detecting the surrounding circumstances, like as a rainfall sensor for detecting the rain circumstance and a brightness sensor for detecting the surrounding brightness. The road side apparatus 20 further has a timer part 27. The road side apparatus 20 generates traffic circumstance information representative of the traffic circumstance, and then transmits the generated traffic circumstance information to the vehicle 1 through the communicating part 23. The traffic circumstance information contains information such as: video information for outputting the video obtained by the image obtaining part 24; other-vehicles position information representative of the positions of vehicles detected by the position detecting part 25; and reliability information representative of the reliability on the basis of the circumstances detected by the circumstance detecting part 26.

Figure 3:
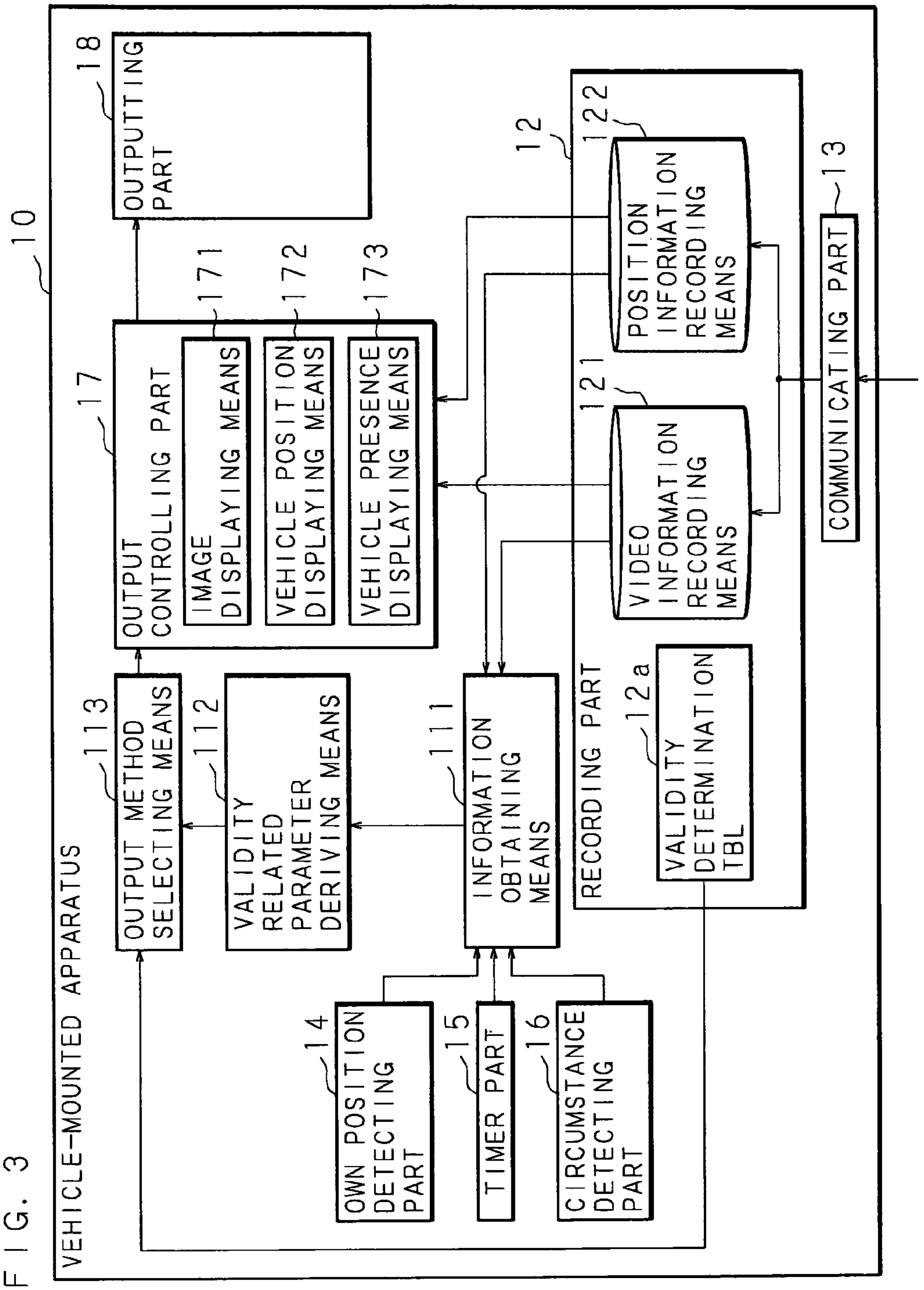
FIG. 3 is a functional block diagram showing an example of the function of a vehicle-mounted apparatus according to Embodiment 1.

FIG. 3 is a functional block diagram showing an example of the function of the vehicle-mounted apparatus 10 according to Embodiment 1. The vehicle-mounted apparatus 10 of the present embodiment receives through the above-mentioned communicating part 13 the traffic circumstance information representative of the traffic circumstances transmitted from the road side apparatus 20. The vehicle-mounted apparatus 10 further records into the video information recording means 121 the video information contained in the received traffic circumstance information as well as the information associated with it. The vehicle-mounted apparatus 10 further records into the position information recording means 122 the other-vehicles position information contained in the received traffic circumstance information as well as the information associated with it. The information associated with the video information indicates information such as the acquisition time (image acquisition time) and the transmission time. The information associated with the other-vehicles position information indicates information such as the acquisition time (detection time), the transmission time, and the detection accuracy. The information such as the detection accuracy is used also as reliability information representative of the reliability of the traffic circumstance information. The video information recording means 121 and the position information recording means 122 are allocated, for example, in a recording area in the recording part 12.

The vehicle-mounted apparatus 10 has image displaying means 171 for causing the outputting part 18 to display a video as driving assist information based on the video information recorded in the video information recording means 121. The vehicle-mounted apparatus 10 further has vehicle position displaying means 172 for causing the outputting part 18 to display an image showing the positions of other vehicles as driving assist information based on the other-vehicles position information recorded in the position information recording means 122. The vehicle-mounted apparatus 10 further has vehicle presence displaying means 173 for causing the outputting part 18 to display information representative of the presence of other vehicles as driving assist information based on the other-vehicles position information. The image displaying means 171, the vehicle position displaying means 172, and the vehicle presence displaying means 173 are processing performing means, for example, corresponding to control programs for output processing executed in the output controlling part 17.

Further, the outputting part 18 may output a video, voice, or the like on the basis of output data generated by the processing performing means and/or the control of the output controlling part 17. The output data may contain video output data, position output data, and presence output data, which are described later. In this case, the image displaying means 171 generates video output data for causing the outputting part 18 to display a video as driving assist information. The vehicle position displaying means 172 generates position output data for causing the outputting part 18 to display as driving assist information an image showing the positions of other vehicles. The vehicle presence displaying means 173 generates presence output data for causing the outputting part 18 to display information representative of the presence of other vehicles as driving assist information.

Further, the vehicle-mounted apparatus 10 has information obtaining means 111. The information obtaining means 111 obtains the video information recorded in the video information recording means 121. The information obtaining means 111 further obtains various information recorded in the position information recording means 122. The information obtaining means 111 further obtains own-vehicle position information representative of the position of the vehicle 1 detected by the own position detecting part 14. The information obtaining means 111 further obtains time information representative of the time obtained by the timer part 15. The information obtaining means 111 further obtains circumstance information representative of the circumstance detected by the circumstance detecting part 16. The information obtaining means 111 further obtains such various information. The vehicle-mounted apparatus has validity related parameter deriving means 112. From the obtained circumstance, this means derives information corresponding to the condition items of the allowable conditions to be satisfied for each output method in the validity determination table 12*a* becoming effective. The vehicle-mounted apparatus has output method selecting means 113. On the basis of the validity determination table 12*a*, this means determines the validity of processing performing means in which outputting processing is to be performed. This means selects one piece of processing performing means determined as being effective. The information obtaining means 111, the validity related parameter deriving means 112, and the output method selecting means 113 are, for example, program modules executed on the basis of the control of the controlling part 11.

FIG. 4 is an explanation diagram conceptually showing an example of recording contents of the validity determination table 12*a* provided in the vehicle-mounted apparatus 10 according to Embodiment 1. The validity determination table 12*a* records output methods such as video display, vehicle position display, and vehicle presence display. These output methods are in correspondence to premise conditions concerning the circumstance at the time of output. These premise conditions are in correspondence to allowable conditions to be satisfied for each output method becoming effective. The output method selecting means 113 refers to the validity determination table 12*a*. This means determines the validity of each output method on the basis of whether or not all the allowable conditions set up for each circumstance at the time of output are satisfied. The premise conditions concerning the circumstances at the time of output are the distance to a crossing and the like. The condition items of the allowable conditions to be satisfied for each output method becoming effective are, for example: the time delay; the update frequency (the frame rate) of the video concerning the video information; and the update frequency of the other-vehicles position information representative of the positions of other vehicles approaching a crossing. The distance to the crossing is derived on the basis of the position of the own vehicle 1. The time delay, the frame rate, and the information update frequency are derived on the basis of the receiving situation.

The distance to the crossing indicates the distance between the position of the vehicle 1 indicated by the own-vehicle position information and the crossing where the vehicle 1 is to enter. This distance indicates a premise condition concerning the circumstances at the time of output, like a situation that the distance from the own vehicle to the crossing is less than 30 m or alternatively 30 m or greater. The time delay indicates the time having elapsed from the time when the road side apparatus 20 obtained or transmitted the traffic circumstance information to the time when the vehicle-mounted apparatus 10 received the information. This time delay indicates an allowable condition required for each output method becoming effective, like 0.2 sec or less and 0.4 sec or less. Here, the time delay is calculated on the basis of the acquisition time or the transmission time contained in the traffic circumstance information. This time delay is one piece of the information concerning the validity of the processing performing means. The video information update frequency (the frame rate) is information representative of the update frequency of a video displayed on the basis of the video information. This update frequency indicates an allowable condition required for each output method becoming effective, like 30 fps or greater and 15 fps or greater. Here, the video information update frequency is one piece of the information concerning the validity of the processing performing means. The other-vehicles position information update frequency is information representative of the receiving cycle of the other-vehicles position information representative of the positions of other vehicles approaching the crossing. This update frequency indicates an allowable condition required for each output method becoming effective, like 10 Hz or greater and 5 Hz or greater. Here, the other-vehicles position information update frequency is one piece of the information concerning the validity of the processing performing means.

Figure 5A:
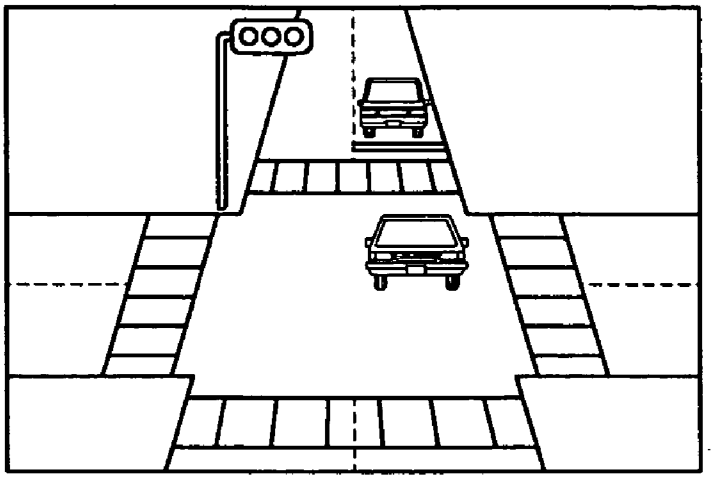
FIGS. 5A to 5C are explanation diagrams each showing an example of an image outputted from an outputting part provided in a vehicle-mounted apparatus according to Embodiment 1.
Figure 5B:
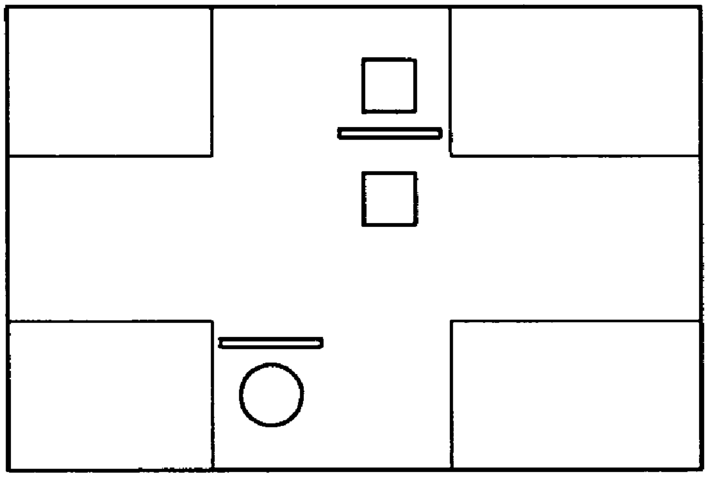
Figure 5C:
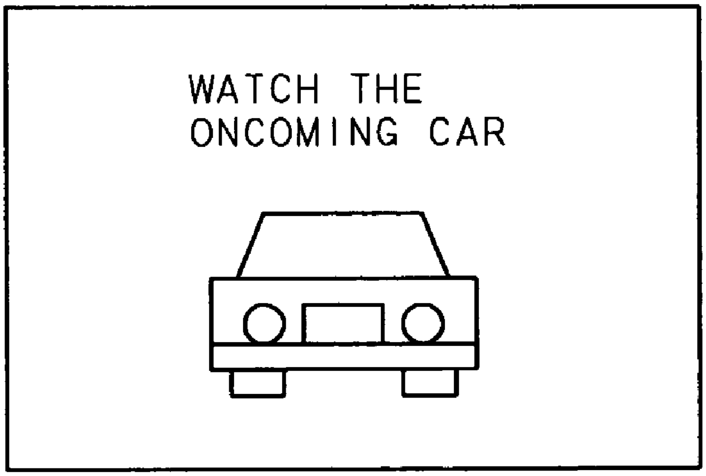

Next, the image outputted by each processing performing means is described below. FIGS. 5A to 5C are explanation diagrams each showing an example of an image outputted from the outputting part 18 provided in a vehicle-mounted apparatus 10 according to Embodiment 1. FIG. 5A shows an image displayed by the image displaying means 171. As shown in FIG. 5A, the image displayed by the image displaying means 171 is a video based on the video information. In the example shown in FIG. 5A, this image is a video showing a road (crossing) and vehicles that are running. FIG. 5B shows an image displayed by the vehicle position displaying means 172. As shown in FIG. 5B, the image displayed by the vehicle position displaying means 172 is an image of the road that shows the crossing schematically. In this image, a circular image representative of the own vehicle 1 is shown in superposition on square images representative of other vehicles. The displayed positions of the square images representative of other vehicles and the circular image representative of the own vehicle 1 are positions relative to the road (crossing). FIG. 5C shows an image displayed by the vehicle presence displaying means 173. As shown in FIG. 5C, the image displayed by the vehicle presence displaying means 173 shows merely the presence of an approaching vehicle, with a text and an image. In addition to the display by the vehicle presence displaying means 173, voice may be outputted.

Figure 6:
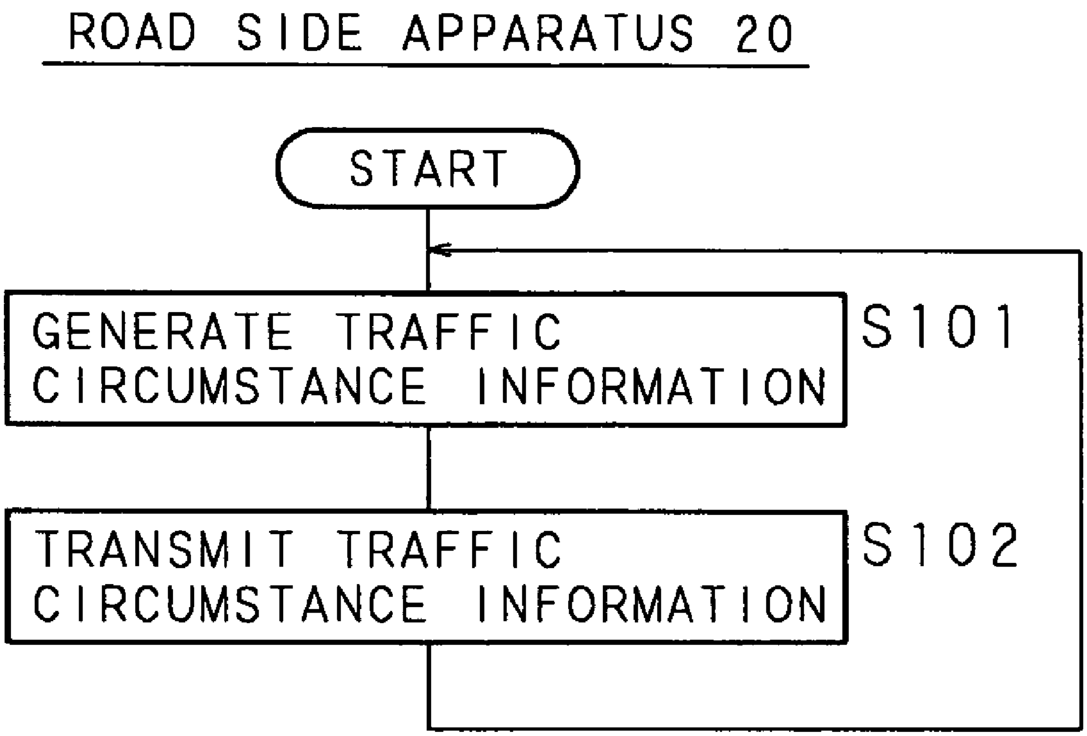
FIG. 6 is an operation flow showing an example of processing in a road side apparatus provided in a driving assist system according to Embodiment 1.

Next, description is given for the processing performed by the various apparatuses provided in the driving assist system according to Embodiment 1. FIG. 6 is an operation flow showing an example of processing in the road side apparatus 20 provided in the driving assist system according to Embodiment 1. On the basis of the control of the controlling part 21, the road side apparatus 20 generates traffic circumstance information (S101). This information is based on the image obtaining performed by the image obtaining part 24 and the detection result of individual vehicles approaching the crossing detected by the position detecting part 25. The road side apparatus transmits the generated traffic circumstance information through the communicating part 23 (S102). The road side apparatus 20 repeats the processing of operations S101 and S102 with a predetermined time interval. The traffic circumstance information generated at operation S101 contains the video information and the other-vehicles position information. This traffic circumstance information further contains information representative of the transmission time or the acquisition time associated with such information. The traffic circumstance information contains also such various information. Here, one piece of the traffic circumstance information may contain the video information and the other-vehicles position information. One piece of the traffic circumstance information may further contain traffic circumstance information different from the video information and the other-vehicles position information. For example, the other-vehicles position information may be transmitted in the intervals between the video information pieces transmitted on a frame basis.

Figure 7:
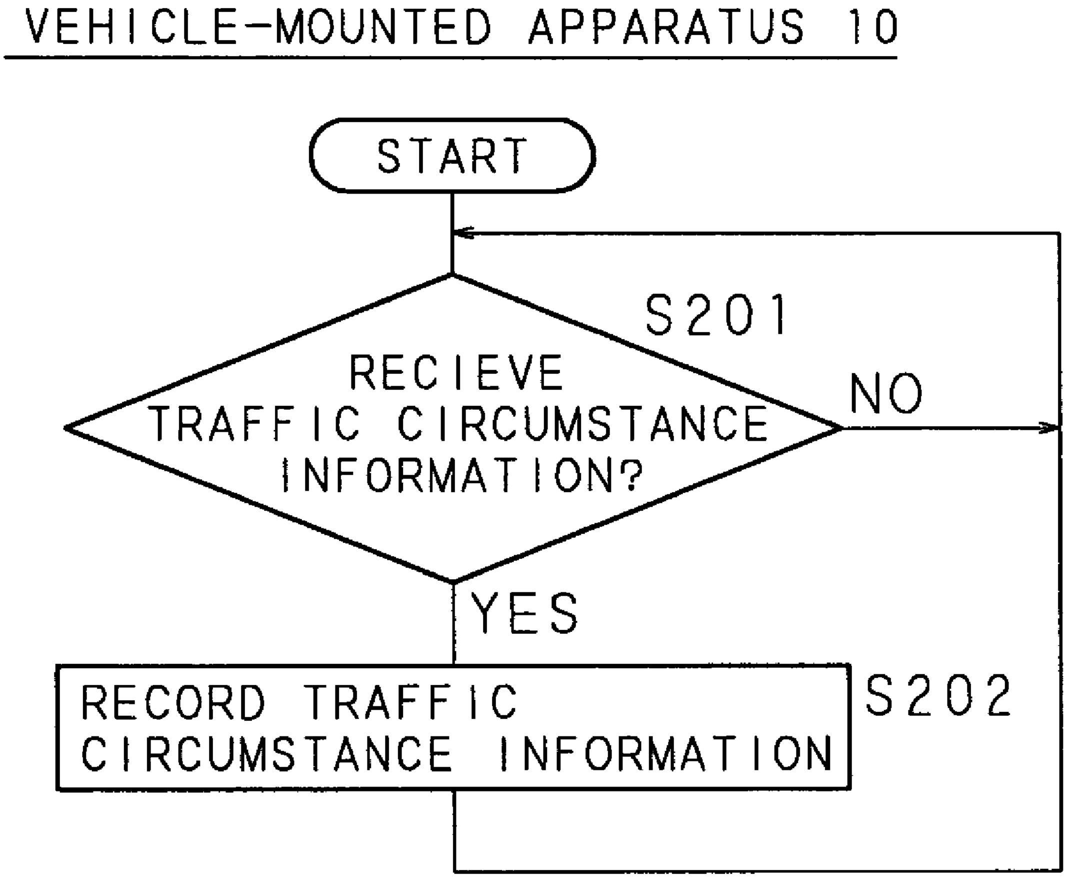
FIG. 7 is an operation flow showing an example of recording processing in a vehicle-mounted apparatus provided in a driving assist system according to Embodiment 1.

FIG. 7 is an operation flow showing an example of recording processing in the vehicle-mounted apparatus 10 provided in the driving assist system according to Embodiment 1. On the basis of the control of the controlling part 11, the vehicle-mounted apparatus 10 determines whether traffic circumstance information has been received by the communicating part 13 (S201).

At operation S201, when it is determined that traffic circumstance information has been received (S201: YES), the vehicle-mounted apparatus 10 records the received traffic circumstance information into the recording part 12 on the basis of the control of the controlling part 11 (S202). Then, the procedure returns to operation S201 so that subsequent processing is repeated. At operation S202, the video information contained in the traffic circumstance information, as well as the information associated with it, is recorded into the video information recording means 121. The other-vehicles position information and the information associated with it are recorded into the position information recording means 122. Here, at operation S201, when it is determined that traffic circumstance information is not received (S201: NO), the procedure returns to operation S201 so that subsequent processing is repeated.

Figure 8:
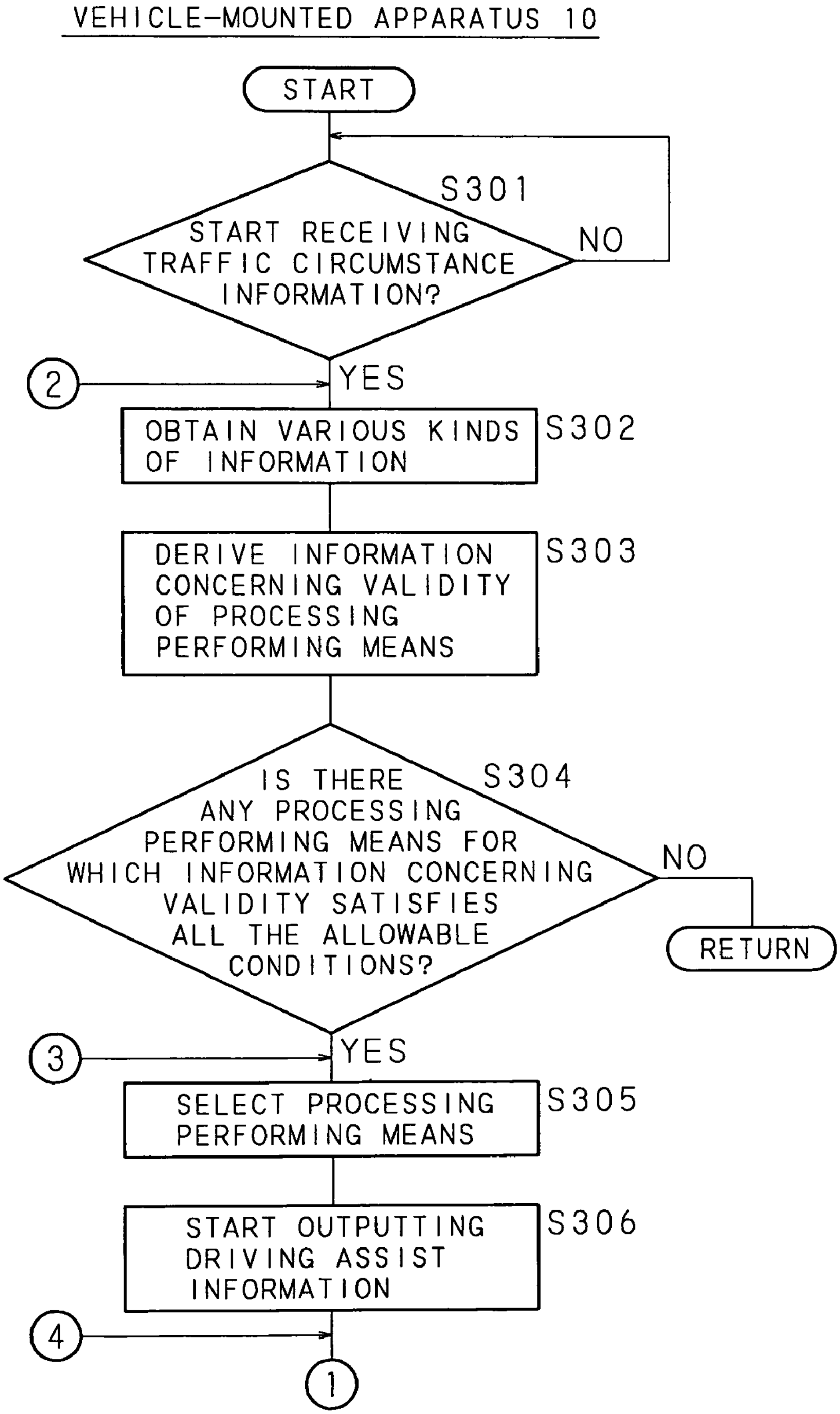
FIG. 8 is an operation flow showing an example of output processing in a vehicle-mounted apparatus provided in a driving assist system according to Embodiment 1.
Figure 9:
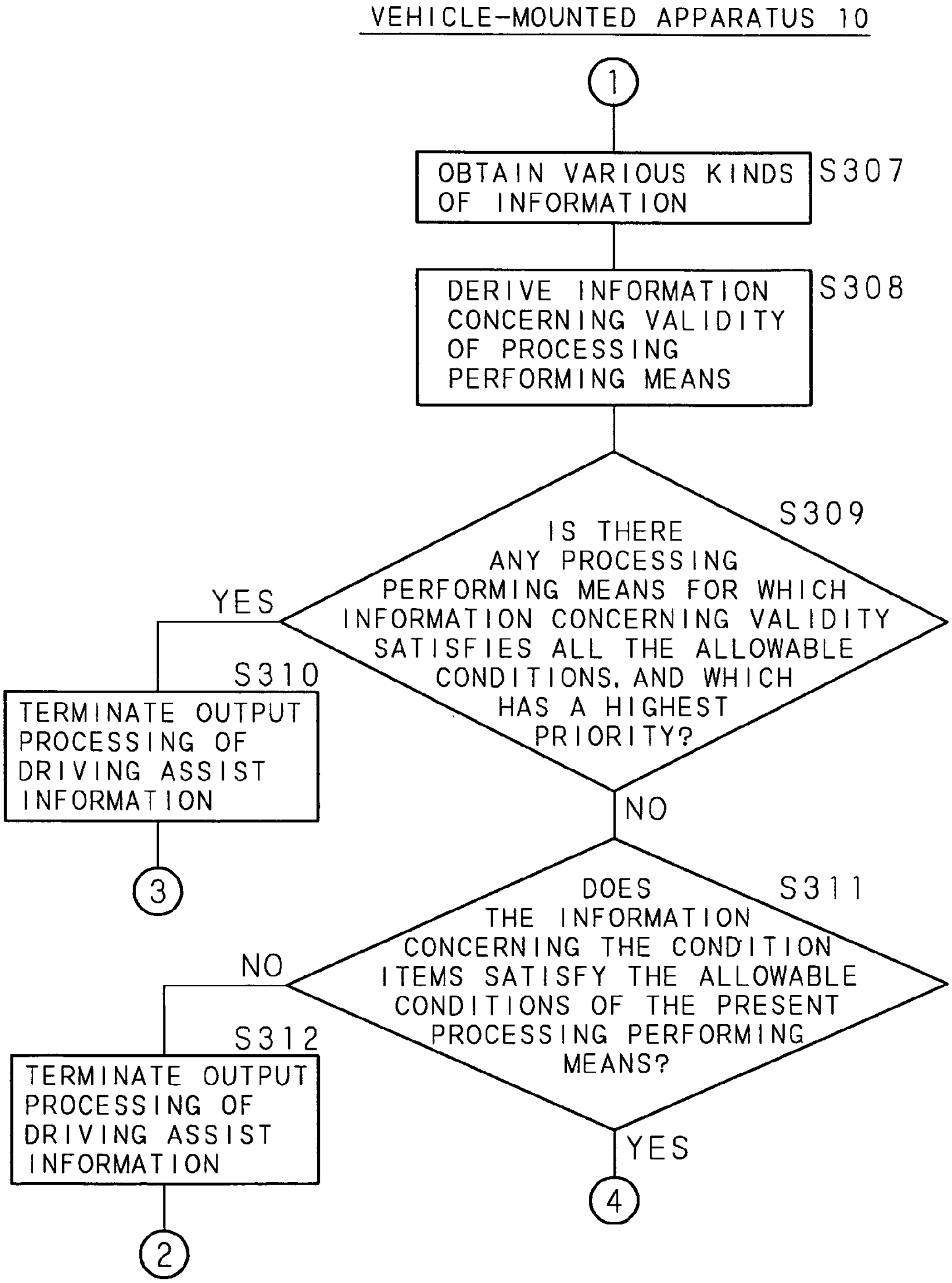
FIG. 9 is an operation flow showing an example of output processing in a vehicle-mounted apparatus provided in a driving assist system according to Embodiment 1.

FIGS. 8 and 9 are operation flows showing an example of output processing in the vehicle-mounted apparatus 10 provided in the driving assist system according to Embodiment 1. The output processing is performed in parallel to the recording processing. On the basis of the control of the controlling part 11, the vehicle-mounted apparatus 10 determines whether receiving of traffic circumstance information has been started (S301). For example, the traffic circumstance information relates to the present circumstance, like a situation that the own vehicle is approaching a crossing. At operation S301, it may be determined whether traffic circumstance information is recorded in the video information recording means 121 and/or the position information recording means 122. At operation S301, when it is determined that receiving of traffic circumstance information has been started (S301: YES), the vehicle-mounted apparatus 10 starts processing at and after operation S302. At operation S301, when it is determined that receiving of traffic circumstance information is not yet started (S301: NO), in the vehicle-mounted apparatus 10, the procedure returns to operation S301 so that subsequent processing is repeated.

As a result of the processing of the information obtaining means 111 based on the control of the controlling part 11, the vehicle-mounted apparatus 10 obtains various kinds of information (S302). This information is the video information recorded in the video information recording means 121 and the information associated with it. Further, this information is the other-vehicles position information recorded in the position information recording means 122 and the information associated with it. Furthermore, this information is the own-vehicle position information representative of the position of the vehicle 1 detected by the own position detecting part 14. Further, this information is the time information representative of the time obtained by the timer part 15. Further, this information is the information concerning the circumstances of the own vehicle 1 detected by the circumstance detecting part 16.

As a result of the processing of the validity related parameter deriving means 112 based on the control of the controlling part 11, the vehicle-mounted apparatus 10 derives information concerning the validity of the processing performing means on the basis of the obtained various kinds of information (S303). This information is the receiving situation of the traffic circumstance information, the distance to the crossing, and the like. The receiving situation of the traffic circumstance information is information such as the time delay, the update frequency of the video information, and the update frequency of the other-vehicles position information. The time delay is the difference duration between the transmission time or the acquisition time indicated in the traffic circumstance information and the receiving time indicated by the timer part 15 at the time of completion of receiving. The update frequency (the frame rate) of the video information is derived from the received video information on the basis of the number of times of update of the screen (frame) in a predetermined time. The update frequency of the other-vehicles position information is derived on the basis of the number of times of update of the other-vehicles position information in a predetermined time. The distance to the crossing is derived, for example, from the relation between the position of the vehicle 1 indicated in the own-vehicle position information and the position of the crossing based on map information held in a car-navigation system.

As a result of the processing of the output method selecting means 113 based on the control of the controlling part 11, the vehicle-mounted apparatus 10 determines the presence or absence of processing performing means for which the derived information concerning the validity satisfies the allowable conditions, on the basis of the validity determination table 12*a* (S304). The situation that that information concerning the validity satisfies the allowable conditions indicates a situation that a premise condition concerning the circumstance in the validity determination table 12*a* is satisfied and then all the allowable conditions corresponding to the premise condition are satisfied. Thus, at operation S304, first, it is determined whether one piece of processing performing means is present for which the information such as the distance to the crossing satisfies the premise condition concerning the circumstance in the validity determination table 12*a*. Then, when the determination is affirmative, it is determined whether one piece of processing performing means satisfied altogether is present for which the information satisfies all the corresponding allowable conditions consisting of the time delay, the update frequency of the video information, and the update frequency of the other-vehicles position information. When the determination is also affirmative, the overall determination of operation S304 is affirmative. Otherwise, the overall determination of operation S304 is negative. For example, in determination based on the validity determination table 12*a* illustrated in FIG. 4, when the distance to the crossing is 25 meters while the time delay is 0.5 sec and the information update frequency is 3 Hz or greater (in the second bottom row), the presence of effective processing performing means is concluded. In contrast, when the distance to a crossing is 35 m and the time delay is 0.5 sec while the frame rate is 20 frame per second (in the condition of the frame rate, the bottom row and the third bottom row are negative), the absence is concluded of processing performing means for which all the allowable conditions are satisfied.

At operation S304, when the presence is concluded of processing performing means for which the information concerning the validity satisfies all the allowable conditions (S304: YES), as a result of the processing of the output method selecting means 113 based on the control of the controlling part 11, the vehicle-mounted apparatus 10 selects processing performing means having the highest priority among the processing performing means for which the information concerning the validity satisfies the allowable conditions, on the basis of the validity determination table 12*a* (S305). Then, the outputting part 18 starts the output of driving assist information based on the traffic circumstance information through the selected processing performing means (S306). For example, at operation S305, when only one piece of processing performing means is present for which the information concerning the validity satisfies the allowable conditions, the vehicle-mounted apparatus 10 selects this processing performing means. Further, for example, when plural pieces of processing performing means are present for which the allowable conditions are satisfied, the vehicle-mounted apparatus 10 selects the piece of processing performing means having the highest priority. In this case, for example, the image displaying means 171 has the highest priority, and the vehicle position displaying means 172 has the next priority. Further, the vehicle presence displaying means 173 has the lowest priority.

Then, on the basis of the control of the controlling part 11, the vehicle-mounted apparatus 10 obtains various kinds of information through the information obtaining means 111 (S307). This information includes: the information associated with the video information; the information associated with the other-vehicles position information; the own-vehicle position information; the time information; and the information concerning the circumstance of the own vehicle 1. On the basis of the control of the controlling part, the vehicle-mounted apparatus derives information concerning the validity of the processing performing means on the basis of the obtained various kinds of information through the validity related parameter deriving means 112 (S308). On the basis of the control of the controlling part 11, the vehicle-mounted apparatus determines the presence or absence of processing performing means for which the derived information concerning the validity satisfies the allowable conditions and which has higher priority than the present processing performing means, through the output method selecting means 113 on the basis of the validity determination table 12*a* (S309). The situation that that information concerning the validity satisfies the allowable conditions indicates a situation that a premise condition concerning the circumstance in the validity determination table 12*a* is satisfied and then all the allowable conditions corresponding to the premise condition are satisfied. The processing of operations S367 to S309 is the processing of determining whether the output of driving assist information based on another processing performing means having higher priority becomes available as a result of a change in various circumstances after the start of output at operation S306. Here, the processing of operation S307 corresponds to the processing of operation S303, while the processing of operation S308 corresponds to the processing of operation S304. As for the priority at operation S309, for example, the image displaying means 171 has the highest priority, and the vehicle position displaying means 172 has the next priority. Further, the vehicle presence displaying means 173 has the lowest priority.

Repeating the above-mentioned description, the information obtaining means 111 obtains, for example, circumstance information representative of the circumstance detected by the circumstance detecting part 16. Then, from the obtained circumstance information, the validity related parameter deriving means 112 derives information corresponding to the condition items of the allowable conditions to be satisfied for each output method in the validity determination table 12*a* becoming effective.

At operation S309, it can be determined affirmatively that processing performing means is present for which the derived information concerning the condition items satisfies all the allowable conditions and which has higher priority than the present processing performing means. When this determination is affirmative (S309: YES), on the basis of the control of the controlling part 10, the vehicle-mounted apparatus 10 terminates the output processing for the driving assist information based on the present processing performing means (S310). Then, the procedure returns to operation S305 so that subsequent processing is repeated. As a result, switching is achieved to the processing performing means having higher priority than the present processing performing means.

At operation S309, it can be determined negatively that the derived information concerning the condition items satisfies not all the allowable conditions or alternatively that processing performing means is absent which has higher priority than the present processing performing means. When this determination is negative (S309: NO) on the basis of the control of the controlling part 11 and/or the validity determination table 12*a*, the vehicle-mounted apparatus 10 determines whether the information concerning the condition items derived at operation S308 satisfies the allowable conditions of the present processing performing means (S311). The processing of operation S311 is the processing of determining whether or not the output of driving assist information based on the present processing performing means is no longer allowed owing to a change in various circumstances after the start of output at operation S306.

At operation S311, when the allowable conditions are determined as being satisfied (S311: YES), on the basis of the control of the controlling part 11, the vehicle-mounted apparatus 10 continues the output processing for the driving assist information in the present processing performing means. Then, the procedure returns to operation S307 so that subsequent processing is repeated.

At operation S311, when the allowable conditions are determined as not being satisfied (S311: NO) on the basis of the control of the controlling part 11, the vehicle-mounted apparatus 10 terminates the output processing for the driving assist information in the present processing performing means (S312). Then, the procedure returns to operation S302 so that subsequent processing is repeated. As a result, switching from the present processing performing means is performed.

Here, at operation S304, when the absence is concluded of processing performing means for which the derived information concerning the condition items satisfies all the allowable conditions (S304: NO), the vehicle-mounted apparatus 10 terminates the output processing for the driving assist information. After the termination of the output processing for the driving assist information, the outputting part 18 restarts the output of the information outputted by the previous time, for example, information of a car-navigation system. Further, also when a change occurs in the circumstances such as completion of passing a crossing by the vehicle 1, the output processing is terminated.

As described above, in the driving assist system of Embodiment 1, in a situation that communication conditions are satisfactory so that a large amount of information can be received, a video is displayed. When the receiving situation that the communication conditions become unsatisfactory, the positions are displayed or alternatively the presence only is displayed. As such, the output method is changed. Further, as the own vehicle 1 approaches a crossing, the conditions for allowance go severe. This is because erroneous recognition can occur that the position of an oncoming vehicle that approaches gradually is misrecognized as being farther than the actual position. For example, in a case that the own vehicle approaches the crossing to turn to the right, the problem of erroneous recognition arises when a video is displayed under the circumstance of a low frame rate or alternatively when the positions of other vehicles are displayed under the circumstances of a low update frequency. When the own vehicle approaches the crossing more, the circumstance can be recognized merely by simple information such as the presence of oncoming vehicles. Thus, safety driving is assisted effectively. Here, the processing performing means may be selected without the detection of the position of the own vehicle 1 and merely on the basis of the traffic circumstance information received from the road side apparatus 20. Further, the processing performing means may be selected with taking into consideration the speed of the own vehicle 1 as the circumstances of the own vehicle 1. In this case, for example, when the speed is less than 8 km/h and in a slow running state or an idling state, the output of driving assist information based on processing performing means having higher priority, for example, the image displaying means 171 is selected. When the speed is not smaller than 8 km/h, the output of driving assist information based on processing performing means having lower priority, for example, the vehicle presence displaying means 173, is selected.

As described above, Embodiment 1 has been given for a mode of assisting the running of a vehicle that turns to the right at a crossing. However, the present embodiment is not limited to this, and may be a mode of assisting the prevention of collision at the time of meeting suddenly or a mode of assisting the merging on a highway. Assist in such various situations is promising.

Further, the condition items are not limited to the examples described above. Thus, various items may be set up. Further, the selection operation may be performed on the basis of a single condition item. Such various modes are possible.

Further, the processing performing means may be methods other than the three kinds described above. Alternatively, they may be selected from two methods, or alternatively from four or more methods. As such, various appropriate designs may be employed.

<Embodiment 2>

Embodiment 2 is a mode that in Embodiment 1, the traffic circumstance information from the road side apparatus is transmitted in a state that reliability information representative of its reliability is added. Various apparatuses provided in a driving assist system according to Embodiment 2 and the configurations of these various apparatuses are similar to those of Embodiment 1. Thus, they are designated by like numerals, and hence their description is omitted.

Similarly to the description in Embodiment 1, the road side apparatus 20 according to Embodiment 2 has the circumstance detecting part 26 for detecting the surrounding circumstances. The circumstance detecting part is, for example, a rainfall sensor for detecting the rain circumstances and a brightness sensor for detecting the surrounding brightness. The road side apparatus transmits reliability information representative of the reliability based on information of the circumstances detected by the circumstance detecting part 26, in a state of being added to the traffic circumstance information. The reliability indicated by the reliability information is, for example, the accuracy of the positions of other vehicles detected by the position detecting part 25. This reliability is information representative of an error range such as 2 m and 3 m. The error range is derived by the road side apparatus 20. This error range is based on the circumstances of rainfall, the surrounding brightness, and the distance detected by the position detecting part 25. For example, an error table may be provided in which the error range is recorded in correspondence to the circumstances detected by the circumstance detecting part 26 and the distance detected by the position detecting part 25. Using this, the error range can be calculated. As for the video information, in rain or at night, when the reliability is low, the reliability information is not added and the video information itself is not transmitted. This is because the usefulness of video information degrades remarkably in rain or at night.

FIG. 10 is an explanation diagram conceptually showing an example of recording contents of the validity determination table 12*a* provided in the vehicle-mounted apparatus 10 according to Embodiment 2. The vehicle-mounted apparatus 10 according to Embodiment 2 selects processing performing means with taking into consideration also the reliability indicated by the reliability information added to the traffic circumstance information. Thus, in the validity determination table 12*a*, the error range which is a condition item concerning the reliability is included as an allowable condition to be satisfied for each output method becoming effective. As shown in FIG. 10, in the validity determination table 12*a*, the output methods such as video display, vehicle position display, and vehicle presence display are recorded in correspondence to the allowable conditions to be satisfied for each output method becoming effective. The condition items of the allowable conditions to be satisfied for each output method becoming effective include the time delay, the video information update frequency (the frame rate), the other-vehicles position information update frequency, and the error range. This error range is the reliability indicated by the reliability information of the other-vehicles position information.

In Embodiment 2, images outputted from the individual processing means are similar to those of Embodiment 1. Thus, Embodiment 1 is to be referred to, and their description is omitted.

Figure 11:
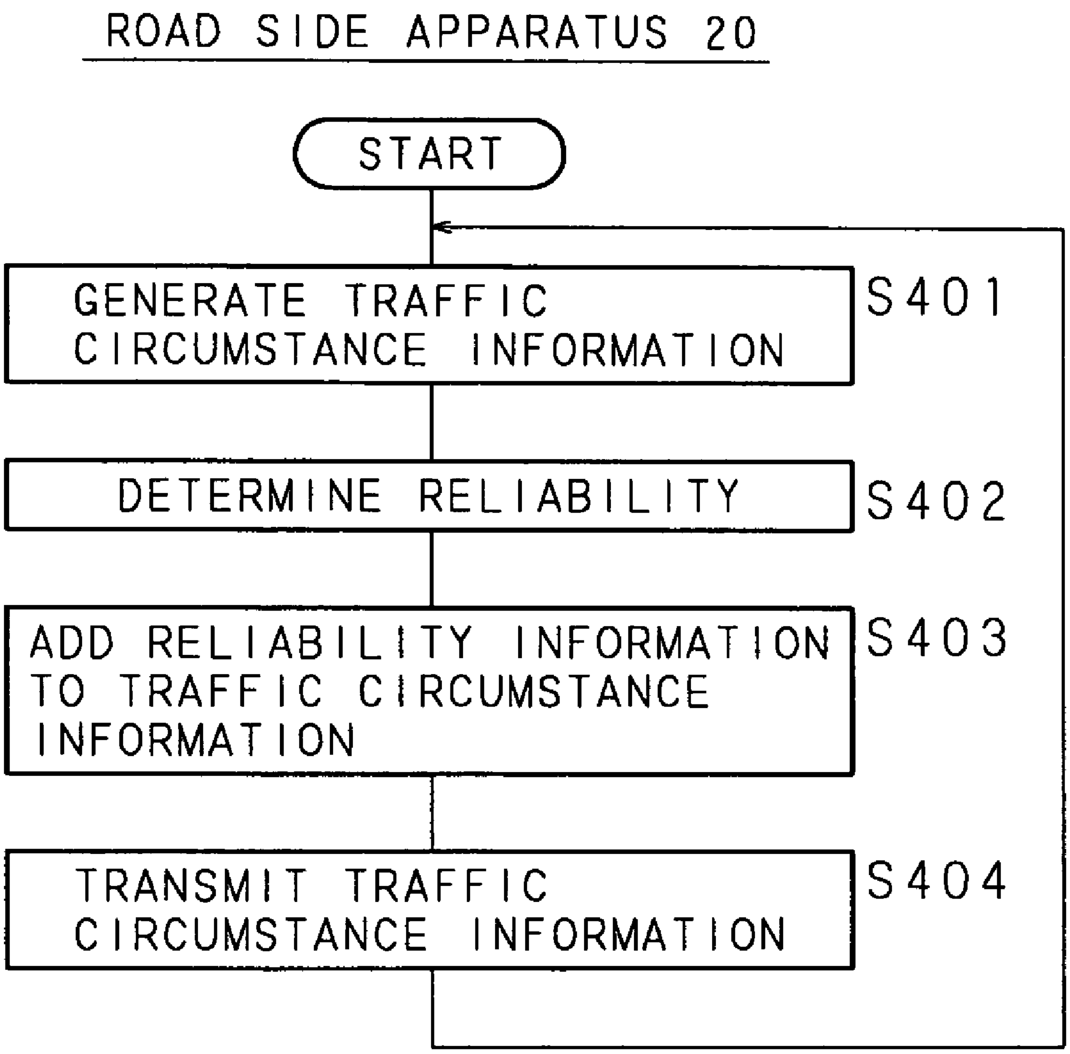
FIG. 11 is an operation flow showing an example of processing in a road side apparatus provided in a driving assist system according to Embodiment 2.

Next, description is given for the processing performed by the various apparatuses provided in the driving assist system according to Embodiment 2. FIG. 11 is an operation flow showing an example of processing in the road side apparatus 20 provided in the driving assist system according to Embodiment 2. On the basis of the control of the controlling part 21, the road side apparatus 20 generates traffic circumstance information on the basis of the image obtained by the image obtaining part 24 and the detection of individual vehicles approaching the crossing detected by the position detecting part 25 (S401). On the basis of the control of the controlling part, the road side apparatus determines the reliability on the basis of the distance obtained using the detected positions of the individual vehicles and the circumstance detected by the circumstance detecting part 26 (S402). On the basis of the control of the controlling part, the road side apparatus adds to the traffic circumstance information the reliability information representative of the reliability (S403). The transmitting part 23 transmits the traffic circumstance information containing the reliability information (S404). Then, in the road side apparatus 20, the procedure returns to operation S401 so that subsequent processing is repeated.

The processing of the vehicle-mounted apparatus 10 provided in the driving assist system according to Embodiment 2 is almost similar to that of Embodiment 1. Thus, Embodiment 1 is to be referred to. However, as for the validity determination table 12*a* referred to by the outputting method selecting means 113, an validity determination table 12*a* is employed that represents the error range as a condition item for determining validity. Here, the validity determination table 12*a* shown in FIG. 10 does not contain premise conditions concerning the circumstance at the time of output such as the distance to the crossing based on the position information of the own vehicle 1. However, these items may be added to the validity determination table 12*a*.

<Embodiment 3>

Embodiment 3 is a made that in Embodiment 1, the vehicle-mounted apparatus determines the reliability of the traffic circumstance information. Various apparatuses provided in a driving assist system according to Embodiment 3 and the configurations of these various apparatuses are similar to those of Embodiment 1. Thus, they are designated by like numerals, and hence their description is omitted.

Similarly to the description in Embodiment 1, the vehicle-mounted apparatus 10 according to Embodiment 3 has the circumstance detecting part 16 for detecting the circumstances of the vehicle 1 such as the lighting situation of the headlamps and the operating situation of the wipers. The circumstance detecting part 16 further derives information concerning the validity of the processing performing means on the basis of the circumstances detected by the circumstance detecting part 16. The information concerning the validity of the processing performing means derived on the basis of the circumstances detected by the circumstance detecting part 16 indicates the reliability of the traffic circumstance information received from the road side apparatus 20. For example, the rain circumstances can be determined from the operating situation of the wipers. Thus, when the wipers are not in operation, high reliability is concluded in the positions of other vehicles indicated by the other-vehicles position information. When the wipers are in operation, rain is falling. Thus, the radio waves of the radar used in the position detection is attenuated by the raindrops, and hence medium reliability is concluded. Further, the surrounding brightness can be determined on the basis of the lighting situation of the headlamps. Thus, when the headlamps are OFF, high reliability is concluded in the video displayed on the basis of the video information. When the headlamps are ON, the circumferences is dark. Thus, low reliability is concluded in the video displayed on the basis of the video information. The determination of the reliability of the traffic circumstance information is implemented by providing in advance a reliability table in which the circumstances detected by the circumstance detecting part 16 is recorded in correspondence to the reliability.

FIG. 12 is an explanation diagram conceptually showing an example of recording contents of the validity determination table 12*a* provided in the vehicle-mounted apparatus 10 according to Embodiment 3. On the basis of the circumstances detected by the circumstance detecting part 16, the vehicle-mounted apparatus 10 according to Embodiment 3 derives information concerning the validity of the processing performing means. Thus, the validity determination table 12*a* contains the position accuracy and the video validity as allowable conditions to be satisfied for each output method becoming effective: As shown in FIG. 12, in the validity determination table 12*a*, condition items such as the time delay, the video information update frequency (the frame rate), the other-vehicles position information update frequency, the position accuracy, and the video validity are recorded in correspondence to the information representative of the processing performing means such as video display, vehicle position display, and vehicles existence position display. The position accuracy is the reliability of the positions of other vehicles indicated by the other-vehicles position information received from the road side apparatus 20. The video validity is the reliability of the video displayed on the basis of the video information.

In Embodiment 3, images outputted from the individual processing means are similar to those of Embodiment 1. Thus, Embodiment 1 is to be referred to, and their description is omitted.

The processing of the road side apparatus 20 provided in the driving assist system according to Embodiment 3 is similar to that of Embodiment 1. Further, the processing of the vehicle-mounted apparatus 10 is almost similar to that of Embodiment 1. However, as for the validity determination table 12*a* referred to by the outputting method selecting means 113, an validity determination table 12*a* is employed that represents the position accuracy and the video validity as allowable conditions to be satisfied for each output method becoming effective Here, the validity determination table 12*a* shown in FIG. 12 does not contain premise conditions concerning the circumstance at the time of output such as the distance to a crossing based on the position information of the own vehicle 1. However, these items may be added to the validity determination table 12*a*.

As described above, Embodiment 3 has been given for a mode that the information concerning the validity of the processing performing means is derived on the basis of the circumstances of the own vehicle. However, embodiments are not limited to the above-mentioned description. That is, information such as the rain circumstances may be received from the road side apparatus. Then, information concerning the validity of the processing performing means may be derived on the basis of the rain circumstances indicated by the received information. Such various modes may be employed.

In the driving assist system and the vehicle-mounted apparatus, a road side apparatus installed on the road side obtains traffic circumstance, then generates traffic circumstance information representative of the obtained traffic circumstance, and then transmits the information to the vehicle-mounted apparatus. Then, the vehicle-mounted apparatus selects one from plural pieces of processing performing means and then performs output on the basis of the traffic circumstance information by an output method associated with the selected processing performing means. More specifically, the vehicle-mounted apparatus has a table in which the processing performing means and allowable conditions to be satisfied for the processing performing means becoming effective are recorded in correspondence to each other. Then, the vehicle-mounted apparatus determines the validity of the processing performing means on the basis of whether the information concerning the validity of the processing performing means derived from the received traffic circumstance information satisfies the allowable conditions. Then, the vehicle-mounted apparatus selects one piece of processing performing means determined as being effective, and then performs output on the basis of the traffic circumstance information through the selected processing performing means.

According to this configuration, for example, even when the receiving situation of the traffic circumstance information degrades, information presentation is performed in a state that on the basis of the information concerning the validity of the processing performing means such as the update frequency and the time delay of the traffic circumstance information, processing performing means is selected that satisfies the allowable conditions to be satisfied for the processing performing means becoming effective. This reduces the possibility that the driver makes erroneous determination. Further, effective information is presented to a driver so that the safety is improved. As such, satisfactory effects are obtained.

More specifically, the output method based on the traffic circumstance information is changed appropriately like a video based on video information, an image showing the positions of other vehicles based on position information, and output representative of the presence of other vehicles based on position information. By virtue of this, information output is achieved in accordance with the circumstance. That is, for example, when the receiving situation of the traffic circumstance information is satisfactory, an image showing the positions of other vehicles is outputted. In contrast, when the receiving situation is unsatisfactory, only the presence of other vehicles is outputted. This avoids erroneous determination made by the driver. Further, effective information is presented to the driver so that the safety is improved. As such, satisfactory effects are obtained.

An output method is selected in accordance with: the receiving situation such as the time delay between the transmission and the receiving of the traffic circumstance information and the information update frequency; the reliability of the traffic circumstance information detected by the road side apparatus; and the circumstances of the own vehicle such as the speed of the own vehicle, the lighting situation of the headlamps, the operating situation of the wipers, and the distance to a crossing. By virtue of this, an appropriate output method is selected so that the safety is improved. As such, satisfactory effects are obtained.

As this description may be embodied in several forms without departing from the spirit of essential characteristics thereof, the present embodiment is therefore illustrative and not restrictive, since the scope of the description is defined by the appended claims rather than by description preceding them, and all changes that fall within metes and bounds of the claims, or equivalence of such metes and bounds thereof are therefore intended to be embraced by the claims.

What is claimed is:

1. A driving assist system comprising:

a road side apparatus which is located in a road side, obtains traffic circumstance information of the road and transmits the obtained traffic circumstance information; and a vehicle-mounted apparatus, mounted in a vehicle, which comprises:

a communicating part which receives the transmitted traffic circumstance information;

a storing part which stores plural outputting methods for outputting driving assistant information to assist a driving operation;

an outputting method table which represents associations between the plural outputting methods and the traffic circumstance information to be received;

a validity determination table which represents validities for the plural outputting methods with respect to the traffic circumstance information to be received;

a selecting part which performs a selection of an outputting method from the plural outputting methods, in accordance with the received traffic circumstance information, the outputting method table and the validity determination table; and an outputting part which outputs driving assist information for assisting a driving operation, based on the received traffic circumstance information and shown by the outputting method that is selected by the selecting part, wherein the traffic circumstance information includes video information concerning a video, position information concerning positions of other vehicles, and position information concerning position of at least one other vehicle, the selecting part performs the selection in accordance with the outputting method table and the validity determination table at each time when the traffic circumstance information is received, and the outputting part outputs, with the outputting method based on the selection performed by the selecting part, the video based on the video information, an image representative of the positions of the other vehicles based on the position information, or information representative of presence of the at least one other vehicle based on the position information, as the driving assist information.

2. The driving assist system according to claim 1, wherein the traffic circumstance information includes reliability information representative of reliability, and the selecting part utilizes the reliability represented by the reliability information included in the traffic circumstance information, for performing the selection.

3. The driving assist system according to claim 2, wherein the road side apparatus further comprises:

a position detecting part which detects positions of vehicles;

a controller capable of performing the operation of detecting accuracy of the detected positions; and a communicating part which transmits the traffic circumstance information including both position information representative of the detected positions and the reliability information representative of the detected accuracy.

4. A vehicle-mounted apparatus mounted in a vehicle, comprising:

a communicating part which receives, from an outside, at least one kind of traffic circumstance information representative of traffic circumstance information of the road;

a storing part which stores plural outputting methods for outputting driving assistant information to assist a driving operation;

an outputting method table which represents associations between the plural outputting methods and the traffic circumstance information to be received;

a validity determination table which represents validities for the plural outputting methods with respect to the traffic circumstance information to be received;

a selecting part which performs a selection of an outputting method from the plural outputting methods, in accordance with the received traffic circumstance information, the outputting method table and the validity determination table; and an outputting part which outputs driving assist information for assisting a driving operation, based on the received traffic circumstance information and shown by the outputting method that is selected by the selecting part, wherein the traffic circumstance information includes video information concerning a video, position information concerning positions of other vehicles, and position information concerning position of at least one other vehicle, the selecting part performs the selection in accordance with the outputting method table and the validity determination table every time receiving the traffic circumstance information, and the outputting part outputs, with the outputting method based on the selection performed by the selecting part, the video based on the video information, an image representative of the positions of the other vehicles based on the position information, or information representative of presence of the at least one other vehicle based on the position information, as the driving assist information.

5. The vehicle-mounted apparatus according to claim 4, wherein the outputting part selects one kind of the driving assist information which is determined as valid, on the basis of a predetermined priority.

6. The vehicle-mounted apparatus according to claim 4, wherein reliability information representative of reliability is added to the traffic circumstance information, and the outputting part outputs the driving assistance information in accordance with output validity based on the reliability information added to the traffic circumstance information.

7. The vehicle-mounted apparatus according to claim 4, wherein the outputting part outputs the driving assistance information in accordance with output validity concerning the respective outputting data on the basis of receiving situation.

8. The vehicle-mounted apparatus according to claim 4, further comprising a circumstance detecting part which obtain circumstances of the vehicle which mounts the vehicle-mounted apparatus, wherein the outputting part outputs the driving assistance information in accordance with output validity based on the obtained circumstances of the vehicle.

9. The vehicle-mounted apparatus according to claim 4, further comprising an own position detecting part which detects a position of the vehicle which mounts the vehicle-mounted apparatus, wherein the outputting part outputs the driving assistance information in accordance with output validity based on the obtained position of the vehicle.

10. The vehicle-mounted apparatus according to claim 6, wherein the reliability information corresponds to accuracy of the position which the position information represents.

11. The vehicle-mounted apparatus according to claim 7, further comprising a timer part representative of time of day, wherein the traffic circumstance information includes time information representative of time of the day, and the driving assistance information in accordance with the output validity corresponds to a time delay which is a difference between the time of the day which the time information represents and reception time of the day at which the traffic circumstance information is received.

12. The vehicle-mounted apparatus according to claim 7, wherein the driving assistance information in accordance with the output validity corresponds to an update frequency of the position information.

13. The vehicle-mounted apparatus according to claim 7, wherein the traffic circumstance information includes video outputting data which the outputting part outputs a video as the driving assist information, and the driving assistance information in accordance with the output validity corresponds to an update frequency of the video in accordance with the video output data.

14. The vehicle-mounted apparatus according to claim 8, wherein the circumstance detecting part detects speeds of the respective vehicle as one of the circumstances of the vehicles.

15. The vehicle-mounted apparatus according to claim 8, wherein the circumstance detecting part detects, as the circumstances of the vehicles, an on/off of a headlamp and/or an on/off of a wiper.

16. A driving assist system comprising:

a road side apparatus which is located in a road side, obtains a traffic circumstance and transmits at least one kind of traffic circumstance information representative of the obtained traffic circumstance; and a vehicle-mounted apparatus, which is mounted in a vehicle, receives the transmitted at least one kind of traffic circumstance information and outputs at least one kind of driving assist information for assisting a driving operation, comprising:

communicating means which receives the transmitted traffic circumstance information;

a plurality of kinds of processing performing means each of which outputs a kind of the driving assist information different from one another;

a means selection table which represents associations between the plurality of kinds of processing performing means and the traffic circumstance information to be received;

a validity determination table which represents validities for the plurality of kinds of processing performing means with respect to the traffic circumstance information to be received;

selecting means which selects one of the plurality of kinds of processing performing means, the one being determined as being valid, in accordance with the received traffic circumstance information, the means selection table and the validity determination table; and means which outputs the driving assist information, based on the received traffic circumstance information and shown by the selected one of the plurality of kinds of processing performing means, wherein the traffic circumstance information includes video information concerning a video, position information concerning positions of other vehicles, and position information concerning position of at least one other vehicle, and the means outputs, with the outputting method based on the selection performed by the selecting means, the video based on the video information, an image representative of the positions of the other vehicles based on the position information, or information representative of presence of the at least one other vehicle based on the position information, as the driving assist information.

* * * * *